United States Patent
Siddaraju et al.

(10) Patent No.: US 8,315,831 B2
(45) Date of Patent: Nov. 20, 2012

(54) METHOD FOR DETERMINING ANALOG INPUT FIELD VALUES, LOOP STATUSES, AND DIAGNOSTICS USING MULTIPLE PROCESSING DEVICES AND RELATED SYSTEM

(75) Inventors: Shivakumar Nagammanapalya Siddaraju, Bangalore (IN); Adrianus Cornelis Maria Hamers, Berkel-Enschot (NL)

(73) Assignee: Honeywell International Inc., Morristown, NJ (US)

( * ) Notice: Subject to any disclaimer, the term of this patent is extended or adjusted under 35 U.S.C. 154(b) by 343 days.

(21) Appl. No.: 12/697,046

(22) Filed: Jan. 29, 2010

(65) Prior Publication Data

US 2011/0191051 A1     Aug. 4, 2011

(51) Int. Cl.
    *G06F 19/00*     (2011.01)
(52) U.S. Cl. ........................................................ 702/85
(58) Field of Classification Search .................... 702/85
See application file for complete search history.

(56) References Cited

OTHER PUBLICATIONS

Intersil, Recommended Test Procedures for Analog Switches, AN557.1, Oct. 2002, p. 1-6.*

\* cited by examiner

*Primary Examiner* — Tung S Lau

(57) ABSTRACT

A method includes receiving multiple measurements of an analog signal, where the measurements are taken using multiple measuring devices. The method also includes identifying whether any of the measurements are valid. In addition, the method includes, if at least one of the measurements is valid, generating a final measurement of the analog signal based on the at least one valid measurement.

20 Claims, 9 Drawing Sheets

METHOD FOR DETERMINING ANALOG INPUT FIELD VALUES, LOOP STATUSES, AND DIAGNOSTICS USING MULTIPLE PROCESSING DEVICES AND RELATED SYSTEM

TECHNICAL FIELD

This disclosure relates generally to processing systems. More specifically, this disclosure relates to a method for determining analog input field values, loop statuses, and diagnostics using multiple processing devices and related system.

BACKGROUND

Conventional processing systems routinely include multiple processing devices, such as multiple microprocessors. These processing devices are often arranged in a redundant manner, such as when a primary processing device performs various functions while a secondary processing device waits to take over performance of those functions in the event that the primary processing device fails. This may be useful in various applications. As a particular example, in industrial process control applications, the secondary processing device can begin controlling an industrial process when the primary processing device fails. This is often known as "hot standby," and it allows the industrial process to be controlled after a short amount of switch-over time.

SUMMARY

This disclosure provides a method for determining analog input field values, loop statuses, and diagnostics using multiple processing devices and related system.

In a first embodiment, a method includes receiving multiple measurements of an analog signal, where the measurements are taken using multiple measuring devices. The method also includes identifying whether any of the measurements are valid. In addition, the method includes, if at least one of the measurements is valid, generating a final measurement of the analog signal based on the at least one valid measurement.

In a second embodiment, an apparatus includes multiple measuring devices configured to generate measurements of an analog signal. The apparatus also includes a combination unit configured to identify whether any of the measurements are valid and, if at least one of the measurements is valid, to generate a final measurement of the analog signal based on the at least one valid measurement.

In a third embodiment, a computer readable medium embodies a computer program. The computer program includes computer readable program code for receiving multiple measurements of an analog signal, where the measurements are associated with multiple measuring devices. The computer program also includes computer readable program code for identifying whether any of the measurements are valid and, if at least one of the measurements is valid, for generating a final measurement of the analog signal based on the at least one valid measurement.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
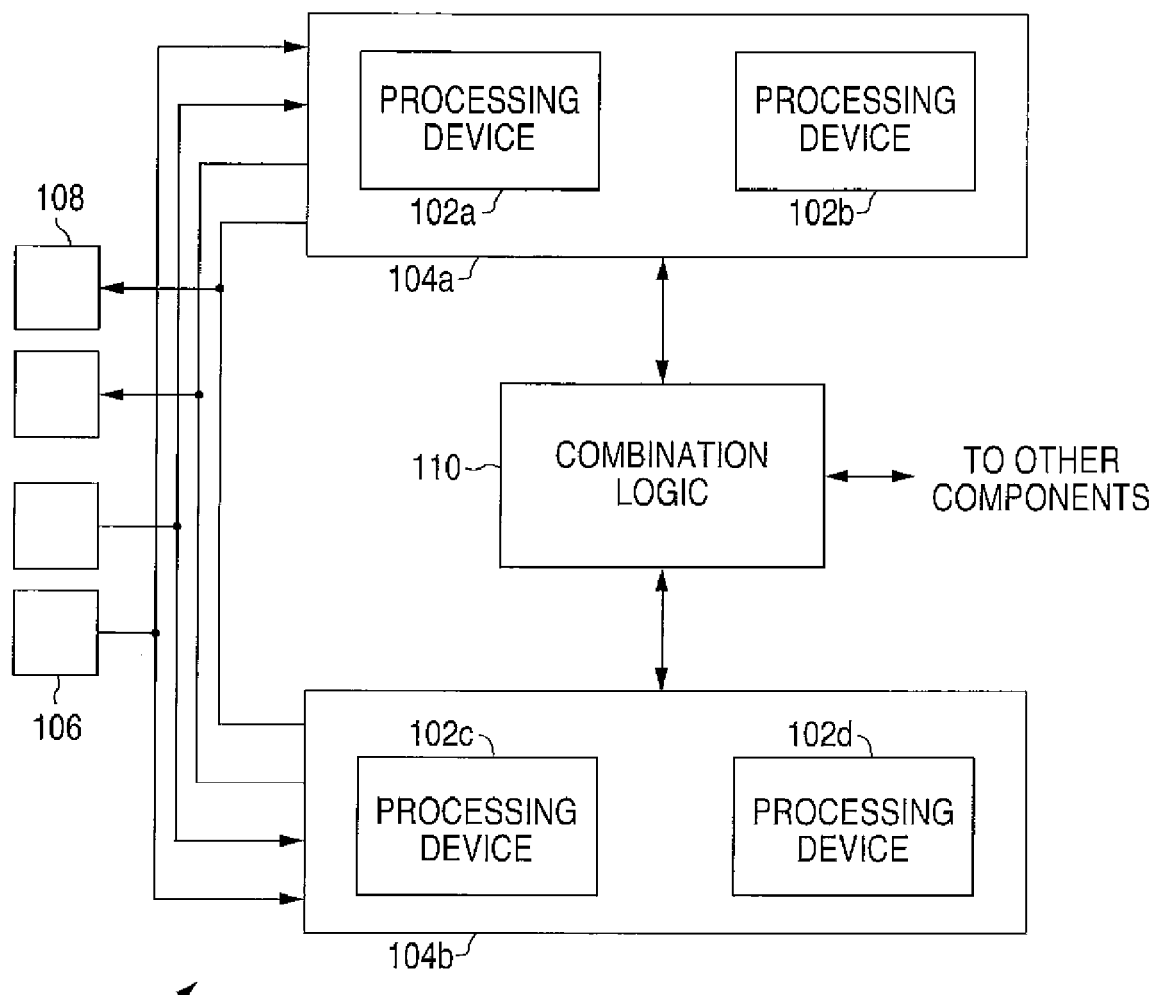
FIG. 1 illustrates an example system for determining analog input field values, loop statuses, and diagnostics using multiple processing devices according to this disclosure.

FIG. 1 illustrates an example system 100 for determining analog input field values, loop statuses, and diagnostics using multiple processing devices according to this disclosure. As shown in FIG. 1, the system 100 includes multiple processing devices 102a-102d. Each processing device 102a-102d represents any suitable structure for executing instructions or otherwise performing one or more functions. The functions may vary widely depending on the specific application. In some embodiments, the processing devices 102a-102d represent microprocessors, microcontrollers, field programmable gate arrays (FPGAs), or application specific integrated circuits (ASICs). In particular embodiments, the processing devices 102a-102d represent microprocessors executing instructions for performing control functions in an industrial process control system. While FIG. 1 illustrates four processing devices 102a-102d, the system 100 could include two or more analog signal measuring devices or other processing devices.

In FIG. 1, the processing devices 102a-102d reside on different printed circuit boards (PCBs) 104a-104b. Each PCB 104a-104b includes any suitable structure on which at least one processing device, other integrated circuits, and signal traces are formed. While FIG. 1 shows two processing devices on each PCB, the processing devices 102a-102d could reside on one or more PCBs. In general, the system 100 could include any number of processing devices residing on any number of PCBs or other structures.

In this example embodiment, each processing device 102a-102d is coupled to one or more input terminals 106 and one or more output terminals 108. Each input terminal 106 represents any suitable structure for receiving an input signal. Each output terminal 108 represents any suitable structure for providing an output signal. Moreover, a terminal could represent an input/output terminal, which could be used for both input and output communications.

In one aspect of operation, multiple processing devices 102a-102d can measure the same input signal present at a common input terminal 106. Also, the processing devices 102a-102d can generate signals that are output on a common output terminal 108 (although the signal from a single processing device could be output at any given time). This may allow, for example, all of the processing devices 102a-102d to read the value of an analog input signal on an input terminal 106 and to generate an output signal that is provided on an output terminal 108. Further, each processing device 102a-102d can identify a loop status, such as whether an input terminal 106 is coupled to an analog input, is open (not connected), or is shorted (connected to ground). In addition, each processing device 102a-102d can identify diagnostics information for that processing device.

When multiple processing devices 102a-102d are reading the value of an input signal, those processing devices may identify different values for the input signal. This could be due to various factors, such as different measurement times, different tolerances in components, and hardware failures. Also, different processing devices 102a-102d could identify different loop statuses for the same input terminal 106 and different diagnostics. This could also be due to various factors, such as hardware failures of one or more of the processing devices.

In accordance with this disclosure, the system 100 includes combination logic 110, which can be used to combine data from multiple processing devices 102a-102d for output to other components. For example, the combination logic 110 could receive multiple measurements of the same analog input signal and output a final measurement that represents one of the measurements or a combination of multiple measurements. The combination logic 110 could also use loop statuses or diagnostics from multiple processing devices 102a-102d to output an overall loop status or diagnostics of the processing devices. The combination logic 110 could perform these functions regardless of the number of processing devices 102a-102d that are healthy and functioning properly at any given time.

Additional details regarding the combination logic 110 are provided below. The combination logic 110 could be implemented using any hardware, software, firmware, or combination thereof for combining data from multiple processing devices. While shown as a separate component in FIG. 1, the combination logic 110 could be incorporated into any larger device(s) or system(s), such as by being incorporated into one or more of the processing devices or PCBs.

Although FIG. 1 illustrates one example of a system 100 for determining analog input field values, loop statuses, and diagnostics using multiple processing devices, various changes may be made to FIG. 1. For example, the system 100 could include any suitable number of processing devices, PCBs, input terminals, output terminals, and combination logic instances.

Figure 2:
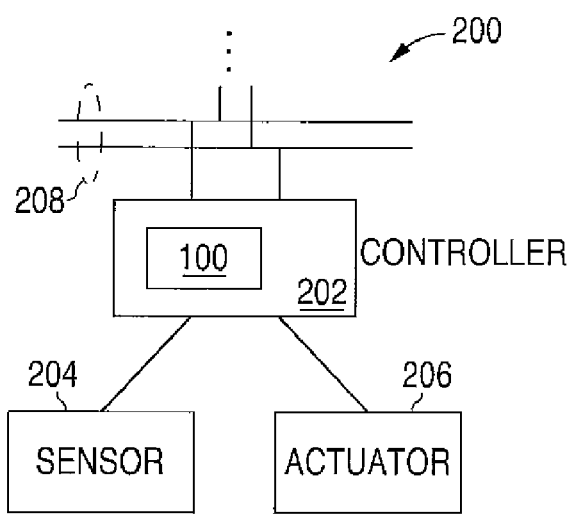
FIG. 2 illustrates a portion of an example industrial process control system according to this disclosure.

FIG. 2 illustrates a portion of an example industrial process control system 200 according to this disclosure. As shown in FIG. 2, the process control system 200 includes an industrial process controller 202, which is used to control at least a portion of an industrial process performed by a process system. The process controller 202 could, for example, receive measurements of various characteristics within a process system and generate control signals for altering other characteristics within the process system. The controller 202 includes any suitable structure for controlling at least a portion of an industrial process. The controller 202 could, for example, represent a computing device that executes a control application or other control logic. Also, a process system may generally represent any system or portion thereof configured to process one or more products or other materials in some manner.

In this example, the process controller 202 is coupled to one or more sensors 204 and one or more actuators 206. The sensors 204 and actuators 206 represent components in a process system that may perform any of a wide variety of functions. For example, the sensors 204 could measure a wide variety of characteristics in the process system, such as temperature, pressure, or flow rate. Also, the actuators 206, such as heaters, motors, or valves, could alter a wide variety of characteristics in the process system. Each sensor 204 includes any suitable structure for measuring one or more characteristics in a process system. Each actuator 206 includes any suitable structure for operating on or affecting one or more conditions in a process system.

The process controller 202 is also coupled to one or more networks 208, which facilitate communication between various components in the process control system 200. The networks 208 could, for example, facilitate communication between the controller 202 and higher-level controllers or other components in the process control system 200. The networks 208 includes one or more local area networks, metropolitan area networks, wide area networks (WANs), all or a portion of a global network, or any other communication system or systems at one or more locations. As a particular example, the networks 208 could represent a pair of Ethernet networks or a redundant pair of Ethernet networks, such as a FAULT TOLERANT ETHERNET (FTE) network from HONEYWELL INTERNATIONAL INC.

In this illustrated embodiment, the process controller 202 includes the system 100 for determining analog input field values, loop statuses, and diagnostics using multiple processing devices. For example, the processing devices 102a-102d could all execute control logic for controlling the industrial process. In some embodiments, one or more of the processing devices 102a-102d function as primary controllers, while one or more other processing devices 102a-102d function as secondary controllers. In these embodiments, a secondary controller may take over when a primary controller fails. In other embodiments, all of the processing devices 102a-102d may execute the same control logic in parallel. This parallel processing can be used to avoid the switch-over times typically associated with the use of hot standby techniques. Either of these techniques could be used in the system 100 and may be particularly beneficial when the processing devices 102a-102d are used in certain types of applications (such as safety-critical applications).

The processing devices 102a-102d in the system 100 and used in the process controller 202 could be used to measure analog input signals from a sensor 204, and the combination logic 110 could be used to combine the measurements from one or more of the processing devices to generate final measurement values. The final measurement values could then be used by the processing devices 102a-102d to generate control signals for an actuator 206. As another example, the processing devices 102a-102d in the system 100 could generate their own loop statuses or diagnostics, and the combination logic 110 could combine the statuses or diagnostics to determine the overall loop status or diagnostics. This information could then be used or made available to other components of the system 200.

The use of the system 100 in the controller 202 can help to ensure that accurate measurements are obtained from a sensor 204 or other analog signal source, even when one or more processing devices are suffering from faults or other problems. The use of the system 100 in the controller 202 can also help to ensure that accurate loop statuses or diagnostics can be obtained by the controller 202.

Although FIG. 2 illustrates one portion of an example industrial process control system 200, various changes may be made to FIG. 2. For example, the process controller 202 could be coupled to any number of sensors and actuators. Also, FIG. 2 illustrates one example operational environment in which the system 100 could be used. The system 100 could be used in any other device or system (whether or not the device or system is process control-related).

Figure 3:
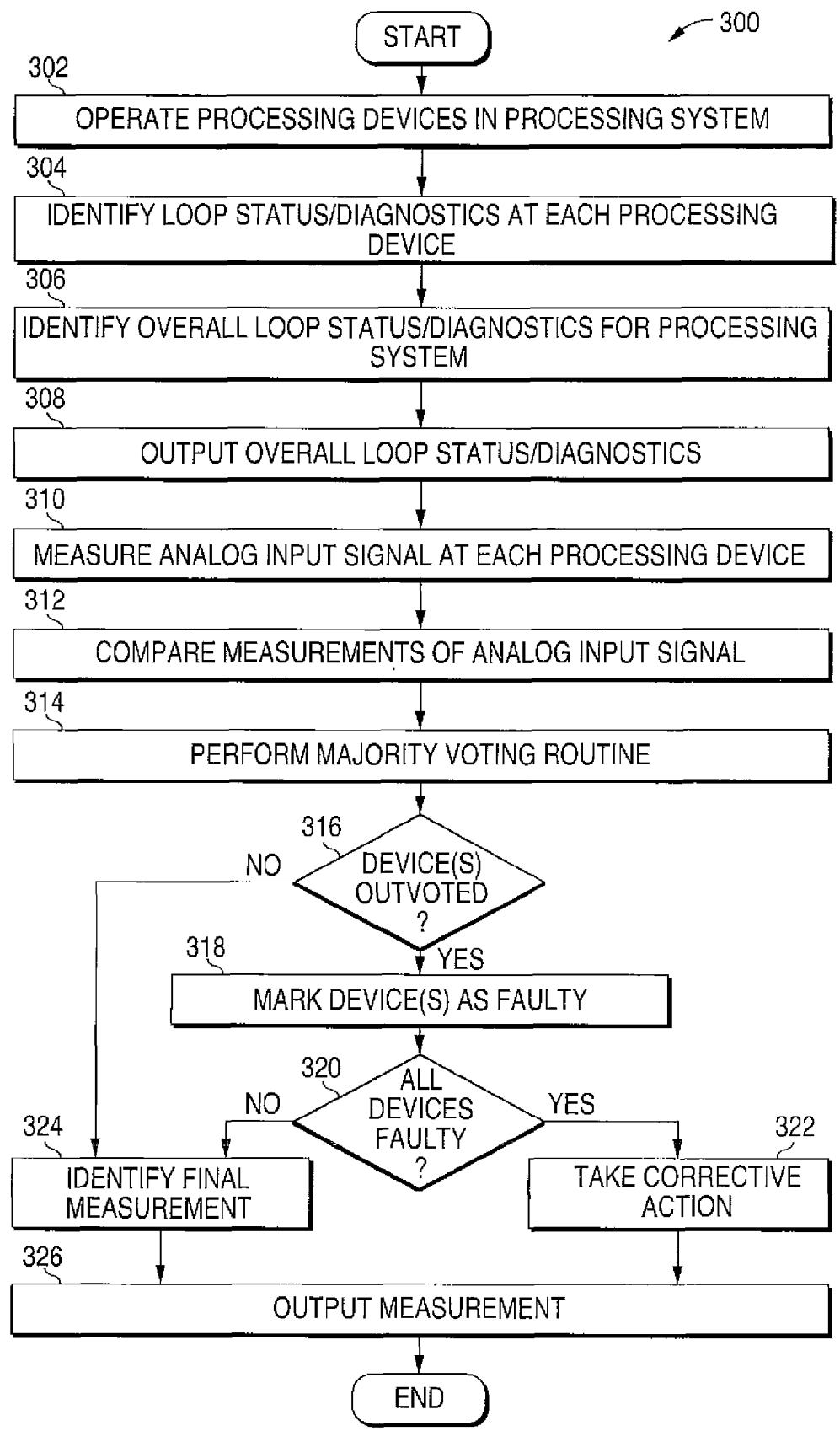
FIG. 3 illustrates an example method for determining analog input field values, loop statuses, and diagnostics using multiple processing devices according to this disclosure.

FIG. 3 illustrates an example method 300 for determining analog input field values, loop statuses, and diagnostics using multiple processing devices according to this disclosure. This method 300 can be used with a system having any suitable number of processing devices. For ease of explanation, the method 300 is described with respect to the system 100 of FIG. 1, although the method could be used in other systems.

As shown in FIG. 3, processing devices are operated in a processing system at step 302. This could include, for example, using the processing devices 102a-102d to execute an industrial control application or other logic.

A loop status or diagnostic information is identified at each processing device at step 304. This could include, for example, each processing device 102a-102d determining whether an input terminal 106 is receiving an analog input signal, is open, or is shorted. An overall loop status or overall diagnostic information for the processing system is identified at step 306 and output at step 308. This could include, for example, the combination logic 110 determining the overall loop status or diagnostic information of the system 100 using the loop statuses or diagnostic information generated by the individual processing devices 102a-102d.

In some embodiments, step 306 could include the combination logic 110 determining multiple loops status/diagnostic values. In particular embodiments, these values include ChDiagAND, ChDiagOR, ShortAND, ShortOR, OpenAND, and OpenOR values, which are described below. These values describe different health conditions of an analog input (AI) loop. In the following description, these values are used to denote the status of different processing devices:

OwnProc=Status of first processing device, such as processing device 102a(1=present and operational)
RedProc=Status of second processing device, such as processing device 102b(1=present and operational)
OwnProcRM=Status of third processing device, such as processing device 102c(1=present and operational)
RedProcRM=Status of fourth processing device, such as processing device 102d(1=present and operational).

Also, the individual processing devices 102a-102d could determine the following individual loop status/diagnostic values at step 304:

AIDiagOwn=AI channel diagnostic value of first processing device
AIDiagRed=AI channel diagnostic value of second processing device
AIDiagOwnRM=AI channel diagnostic value of third processing device
AIDiagRedRM=AI channel diagnostic value of fourth processing device
Shortown=Short loop status of first processing device
ShortRed=Short loop status of second processing device
ShortOwnRM=Short loop status of third processing device
ShortRedRM=Short loop status of fourth processing device
OpenOwn=Open loop status of first processing device
OpenRed=Open loop status of second processing device
OpenOwnRM=Open loop status of third processing device
OpenRedRM=Open loop status of fourth processing device.

In the following discussion, "&" denotes a logical AND operation, and "||" denotes a logical OR operation. The health of each processing device can be determined using the processing device's status values and the AI channel diagnostic values. For example, healthy channel (HChx) values can be determined as follows:

HChOwn: Diagnostic value of first processing device
 HChOwn=AIDiagOwn & OwnProc
HChRed: Diagnostic value of second processing device
 HChRed=AIDiagRed & RedProc
HChOwnRM: Diagnostic value of third processing device
 HChOwnRM=AIDiagOwnRM & OwnProcRM
HChRedRM: Diagnostic value of fourth processing device
 HChRedRM=AIDiagRedRM & RedProcRM.

A ChDiagAND value for the system 100 can be determined as the logical AND of all channel diagnostic values for processing devices that are present. This can be expressed as:

ChDiagAND=((AIDiagOwn||NOT(OwnProc)) &
 (AIDiagRed||NOT(RedProc)) &
 (AIDiagOwnRM||NOT(OwnProcRM)) &
 (AIDiagRedRM||NOT(RedProcRM))).

A ChDiagOR value for the system 100 can be determined as the logical OR of all channel diagnostic values for processing devices that are present. This can be expressed as:

ChDiagOR=
 (HChOwn||HChRed||HChOwnRM||HChRedRM).

A ShortAND value for the system 100 can be determined as the logical AND of all short loop status values for processing devices that are healthy. This can be expressed as:

ShortAND=((ShortOwn||NOT(HChOwn)) &
 (ShortRed||NOT(HChRed)) &
 (ShortOwnRM||NOT(HChOwnRM)) &
 (ShortRedRM||NOT(HChRedRM))).

A ShortOR value for the system 100 can be determined as the logical OR of all short loop status values for processing devices that are healthy. This can be expressed as:

ShortOR=((ShortOwn & HChOwn)||
 (ShortRed & HChRed)||
 (ShortOwnRM & HChOwnRM)||
 (ShortRedRM & HChRedRM)).

An OpenAND value for the system 100 can be determined as the logical AND of all open loop status values for processing devices that are healthy. This can be expressed as:

OpenAND=((OpenOwn||NOT(HChOwn)) &
 (OpenRed||NOT(HChRed)) &
 (OpenOwnRM||NOT(HChOwnRM)) &
 (OpenRedRM||NOT(HChRedRM))).

An OpenOR value for the system 100 can be determined as the logical OR of all open loop status values for processing devices that are present and that do not have a channel fault. This can be expressed as:

OpenOR=((OpenOwn & HChOwn)||
 (OpenRed & HChRed)||
 (OpenOwnRM & HChOwnRM)||
 (OpenRedRM & HChRedRM)).

Note that other or additional loop status or diagnostic values could be used in the system 100.

A measurement of an analog input signal is taken at each processing device at step 310. This could include, for example, one or more of the processing devices 102a-102d measuring a value of an analog input signal received at an input terminal 106. Depending on the health of the processing devices 102a-102d, this step could include any number of processing devices measuring the analog input signal.

Measurements of the analog input signals are compared at step 312, and a majority voting routine is performed at step 314. This could include, for example, the combination logic 110 comparing the measurements to determine if the measurements are within a specific percentage of one another, such as 0.5% or 2%. If so, those measurements are generally viewed as being equal. If not, those measurements are generally viewed as representing different measurements. During the majority voting routine, a decision is made whether a majority of the processing devices' measurements are equal to another (within the specified percentage). For instance, when four processing devices are used and three have "equal" measurements, the majority voting routine could determine that those measurements are likely the correct measurements. When four processing devices are used, two have equal measurements, and two have dissimilar measurements, the majority voting routine could determine that the two similar measurements are likely the correct measurements. When four processing devices are used, two have first equal measurements, and two have second equal measurements different than the first measurements, the majority voting routine could be unable to determine which measurements are likely the correct measurements. When the majority voting routine determines that a processing device's measurement is likely not correct, it is said that the processing device has been "outvoted."

A determination is made whether any processing devices are outvoted by the majority voting routine at step 316. If so, the outvoted processing device(s) can be marked as faulty at step 318. In this way, the system 100 can identify processing devices that are (at least temporarily) providing incorrect measurements. Also, a determination is made whether all processing devices are marked as faulty at step 320. If so, corrective action is taken at step 322. This could include, for example, the combination logic 110 using a prior final measurement (such as the final measurement calculated during a prior iteration of the method 300).

If no processing devices are outvoted or at least one processing device is not marked as faulty, the measurement of at least one processing device is likely valid, and a final measurement of the analog input signal is identified at step 324. If only one processing device has not been marked as faulty, the final measurement could equal the measurement from that processing device. If multiple processing devices have not been marked as faulty, the final measurement could equal the average of the measurements from those processing devices. The final measurement could also equal the measurement that is closest to the average of the measurements from those processing devices. The final measurement (however it is determined) is output at step 326.

Additional details regarding an example technique for identifying a final analog signal measurement are provided below with respect to FIGS. 4 through 9. While these details describe one example implementation, any other implementations of the method 300 could be used.

Although FIG. 3 illustrates one example of a method 300 for determining analog input field values, loop statuses, and diagnostics using multiple processing devices, various changes may be made to FIG. 3. For example, while shown as a series of steps, various steps in FIG. 3 could overlap, occur in parallel, occur multiple times, or occur in a different order. Also, two measurements could be viewed as being similar or equal if they are within a specific amount of each other (rather than a specified percentage).

FIGS. 4 through 9 illustrate example logic for determining field values for an analog input scanned by multiple processing devices according to this disclosure. This logic could be used, for example, by the combination logic 110 in order to determine the final measurement of an analog input signal based on multiple measurements of the analog input signal taken by multiple processing device 102a-102d.

When a processing device 102a-102d takes a measurement of an analog input signal, the value may be valid if the processing device is healthy, the short loop status is healthy, and the open loop status is healthy. These conditions can be used to define the following values:
UOwn=ShortOwn & OpenOwn & HChOwn
URed=ShortRed & OpenRed & HChRed
UOwnRM=ShortOwnRM & OpenOwnRM & HChOwnRM
URedRM=ShortRedRM & OpenRedRM & HChRedRM.
Using these values, "use" values indicating whether a processing device's analog input measurement can be used may be expressed as:
AIUseOwn=UOwn||NOT(URed||UOwnRM||URedRM)
AIUseRed=URed||NOT(UOwn||UOwnRM||URedRM)
AIUseOwnRM=UOwnRM||NOT
 (UOwn||URed||URedRM)
AIUseRedRM=URedRM||NOT
 (UOwn||URed||UOwnRM).
Each of these variables could have a value of "1" if the corresponding measurement is to be used and a value of "0" if the corresponding measurement is not to be used. These variables are used in various ones of FIGS. 4 through 9.

Figure 4A:
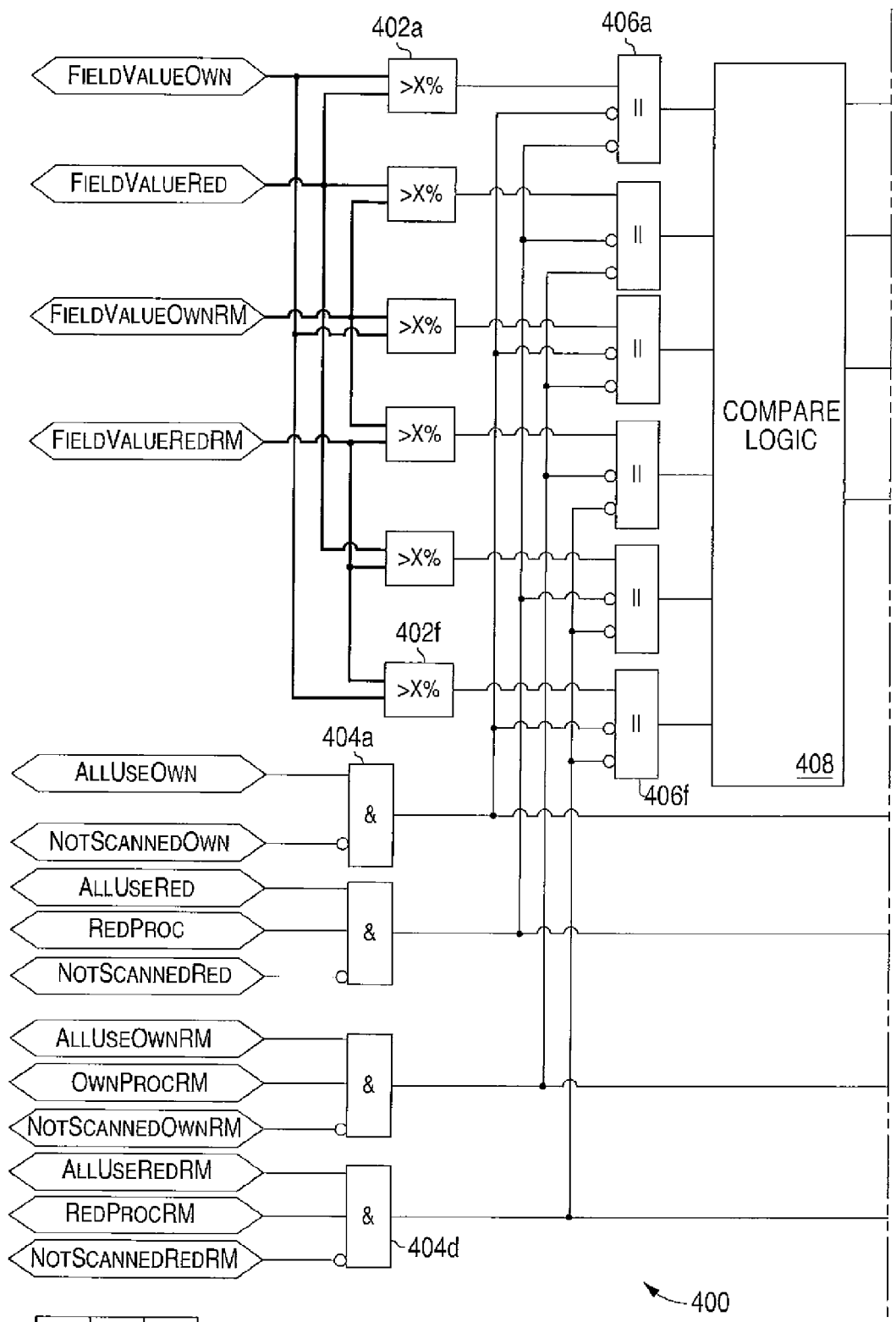
FIGS. 4 through 9 illustrate example logic for determining field values for an analog input scanned by multiple processing devices according to this disclosure.
Figure 4B:
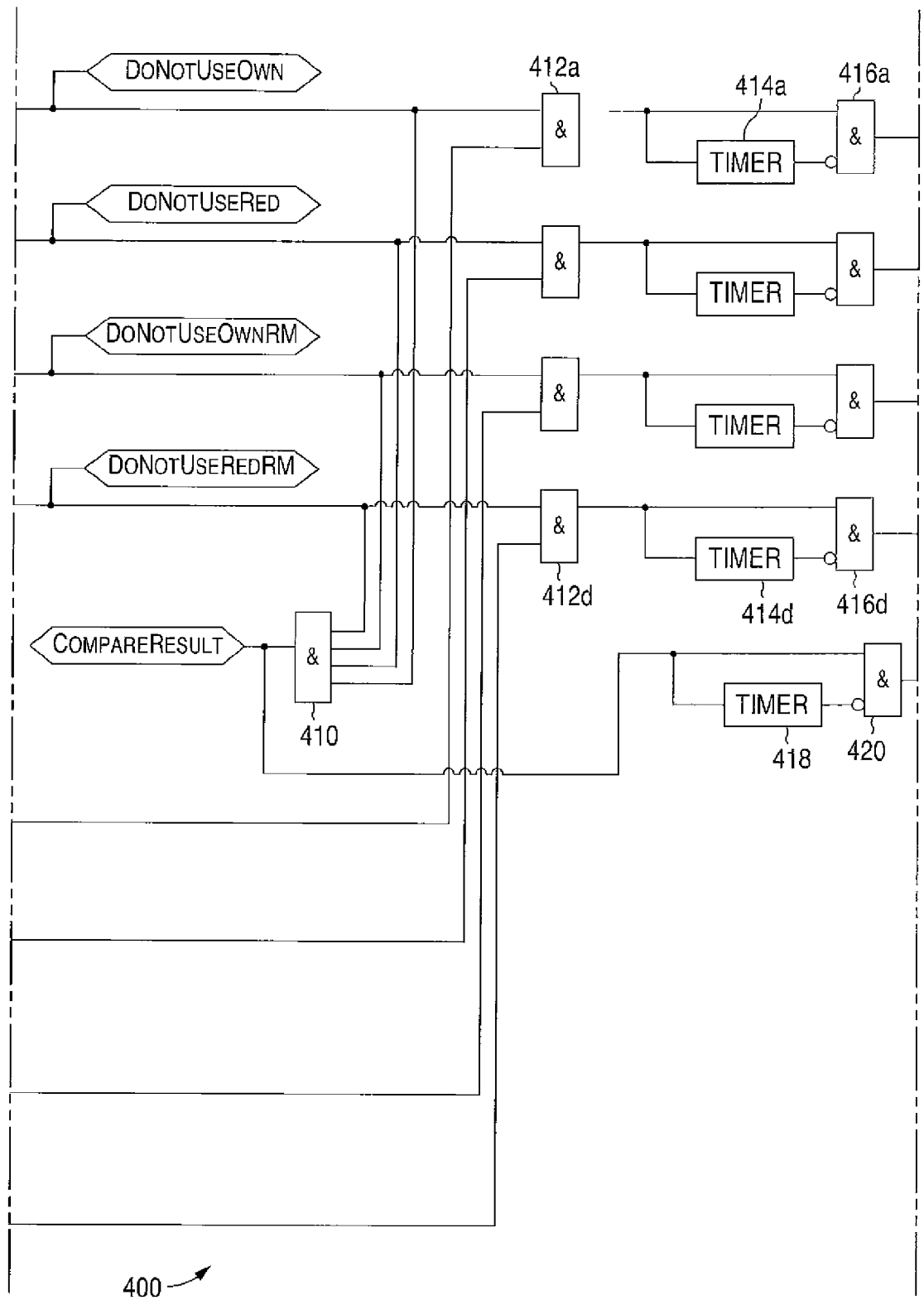
Figure 4C:
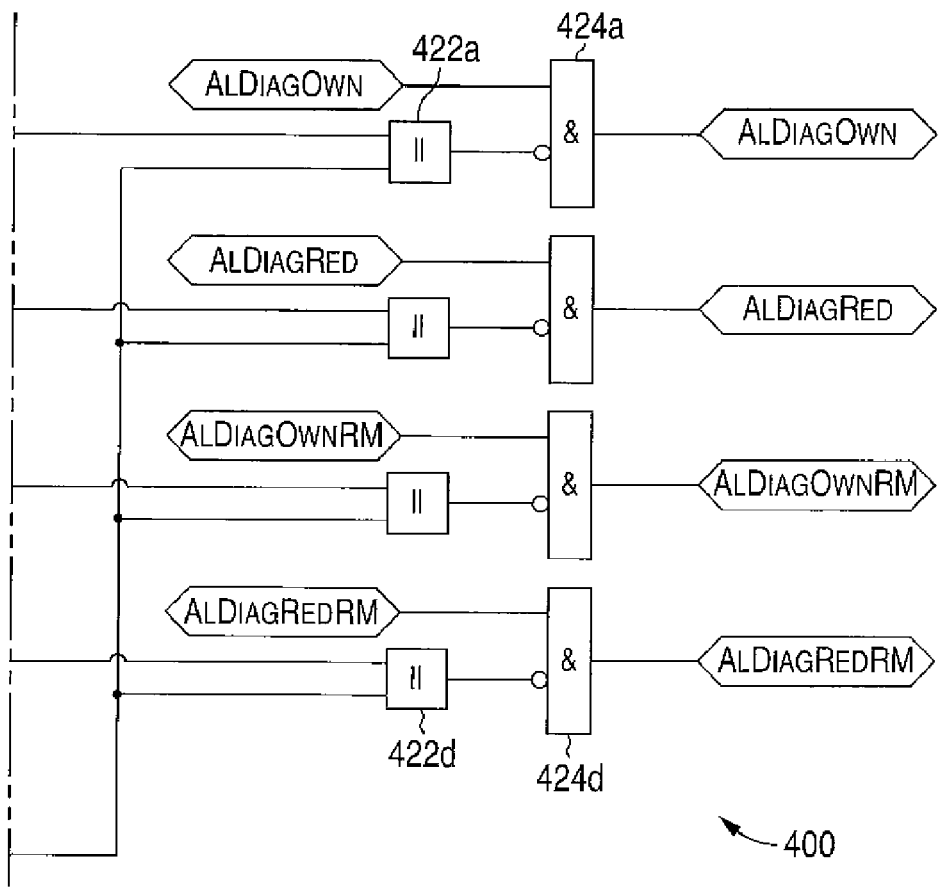

FIG. 4 illustrates comparison and voting logic 400, which compares measurements from different processing devices and determines which measurements (if any) are deemed valid measurements. In this example, the logic 400 receives four analog signal measurements denoted FieldValueOwn, FieldValueRed, FieldValueOwnRM, and FieldValueRedRM. Six unique pairs of these measurements are provided to six comparison units (>X %) 402a-402f, each of which determines whether its two inputs are within a specified percentage of each other. In this way, the comparison units 402a-402f can identify which measurements are similar or equal.

The logic 400 also includes AND units 404a-404d, which receive various signals described above. The AND units 404a-404d also receive four "not scanned" signals denoted NotScannedOwn, NotScannedRed, NotScannedOwnRM, and NotScannedRedRM. Each of these signals indicates whether an analog input signal is scanned by an associated processing device (where "1" indicates that the signal is not scanned).

Outputs from the six comparison units 402a-402f are provided to six OR units 406a-406f, respectively. The OR units 406a-406f also receive outputs from unique pairs of AND units 404a-404d. Each OR unit 406a-406f generates a signal indicating whether a pair of analog signal measurements might be valid, which can occur when the analog signal measurements are approximately equal and the processing devices that generated those measurements are healthy, active, and scanning. These signals are provided to compare logic 408, which uses these signals to generate four outputs denoted DoNotUseOwn, DoNotUseRed, DoNotUseOwnRM, and DoNotUseRedRM. These outputs identify which measurements, if any, can be used to generate a final measurement value (a value of "1" indicates a measurement is not to be used). The compare logic 408 could use any suitable technique for identifying which measurements are to be used, such as a majority voting technique.

The four outputs from the compare logic 408 are provided to an AND unit 410, which generates an indicator denoted CompareResult. This indicator identifies whether at least one analog signal measurement is valid and is to be used to compute the final measurement value. The outputs from the compare logic 408 and from the AND units 404a-404d are also provided to AND units 412a-412d, which generate indicators that identify which individual analog signal measurements (if any) are valid.

The outputs of the AND units 412a-412d are provided to timers 414a-414d and to AND units 416a-416d. Each timer 414a-414d is started (goes high) when a processing device is outvoted, and the processing device is denoted as faulty if the timer elapses (goes low) without the processing device submitting a valid measurement, such as during the next two measurement cycles. The AND units 416a-416d generate indicators identifying whether any of the four measurements are associated with faulty processing devices.

Similarly, the output of the AND unit 410 is provided to a timer 418 and an AND unit 420. When the compare logic 408 is unable to make a "majority rule" decision as to which measurements are valid, the timer 418 is started. This may occur, for example, when two processing devices measure a value of X and two processing devices measure a value of Y. If the timer 418 expires without a valid measurement being identified, the AND unit 420 outputs an indicator identifying that all processing devices are faulty.

Outputs from the AND units 416a-416d and the output from the AND unit 420 are provided to OR units 422a-422d. The OR units 422a-422d generate indicators identifying whether each processing device is faulty, either individually (based on the outputs from the AND units 416a-416d) or collectively (based on the output from the AND unit 420). The outputs of the OR units 422a-422d are provided to AND units 424a-424d. The AND units 424a-424d also receive the AIDiagOwn, AIDiagRed, AIDiagOwnRM, and AIDiagRedRM values. The AND units 424a-424d use these inputs to generate updated AIDiagOwn, AIDiagRed, AIDiagOwnRM, and AIDiagRedRM values. These values identify which individual processing devices generated valid measurements that will be used to generate a final analog signal measurement.

Figure 5:
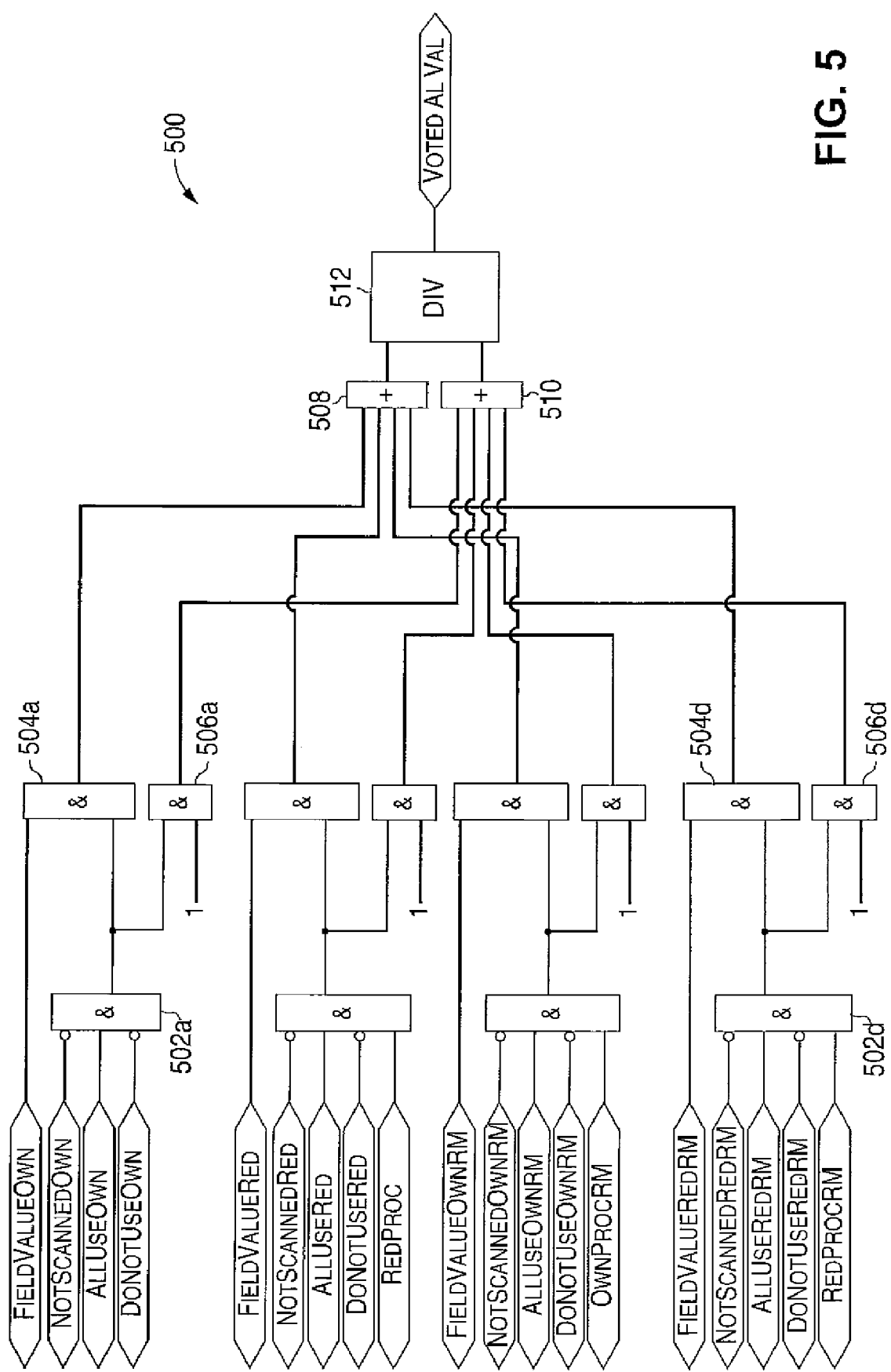

FIG. 5 illustrates voted measurement value logic 500, which determines the average of all measurement values deemed valid by the logic 400. In other words, the final measurement value (denoted "VotedAI Val") is the average of all valid measurement values that are not outvoted by the majority voting routine.

As shown in FIG. 5, the logic 500 includes four AND units 502a-502d, four AND units 504a-504d, and four AND units 506a-506d. The AND units 502a-502d receive various signals described above and output indicators identifying whether each measurement is valid. The AND units 504a-504d perform logical AND operations using the analog signal measurements and the outputs of the AND units 502-502d. Each AND unit 504a-504d therefore either outputs one of the analog signal measurements (if it is valid) or zero. The AND units 506a-506d perform logical AND operations using the outputs of the AND units 502-502d and a logic "1" value.

The outputs of the AND units 504a-504d are provided to a summer 508, which generates a value representing a sum of the valid analog signal measurements. The outputs of the AND units 506a-506d are provided to a summer 510, which generates a value representing the number of valid analog signal measurements. These values are provided to a division unit 512, which divides the output of the summer 508 by the output of the summer 510. This generates an average analog signal measurement, which could be output by the combination logic 110 when at least one measurement from a processing device is deemed valid.

Figure 6:
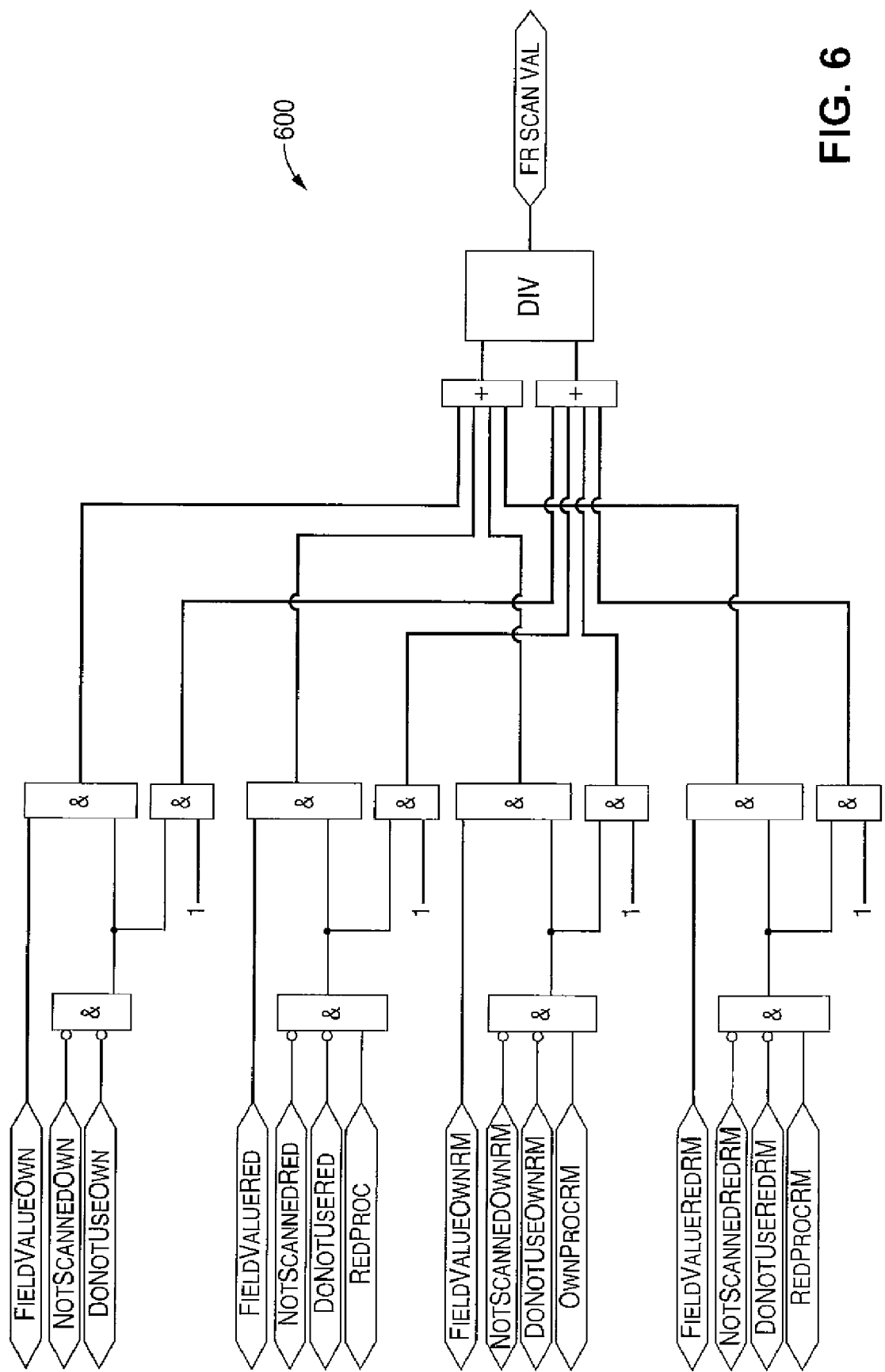

If all processing devices are marked as faulty and no measurements are deemed valid, various other operations could occur. For example, in a "FIXED" mode of operation, the combination logic 110 could output a fixed value denoted "FixedVal." In a "SCAN" mode of operation, the combination logic 110 could use available measurements from one or more processing devices. FIG. 6 illustrates scanning measurement value logic 600, which determines the average value of any available measurements from the processing devices. The logic shown in FIG. 6 is similar to the logic in FIG. 5. However, the logic in FIG. 6 does not use the AIUseOwn, AIUseRed, AIUseOwnRM, and AIUseRedRM values as inputs. The output of the logic 600 is denoted "FR Scan Val," where "FR Scan" stands for "Fault Reaction Scan."

Figure 7:
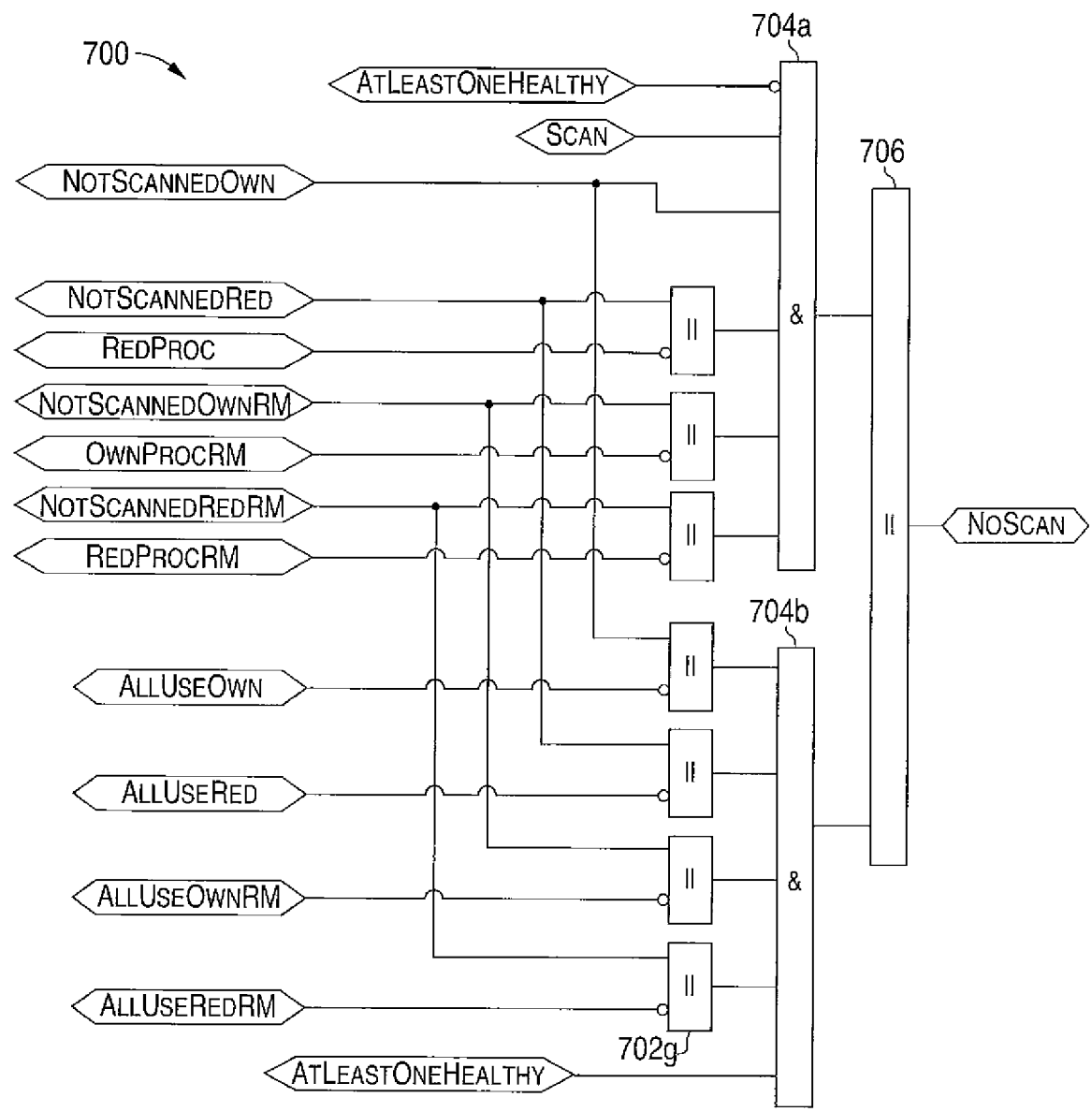

In a "FREEZE" mode, the combination logic 110 could output a previous final analog measurement value, thereby holding or freezing its output. This mode could be entered by explicitly selecting the "FREEZE" mode, when no measurements are available in the SCAN mode, when no processing devices are available to be scanned, or when no majority voting is possible and the timer 418 has not expired. FIG. 7 illustrates no scan logic 700, which determines if and when no measurements or processing devices are available. In this example, seven OR units 702a-702g receive various signals described above, including the "not scanned" signals, the status signals, and the "use" signals. Outputs of the OR units 702a-702g are provided to two AND units 704a-704b, which also receive an "at least one healthy" signal denoting whether at least one processing device is healthy. A "scan" signal is also provided to the AND unit 704a, where the scan signal denotes whether the SCAN mode of operation is being used. The outputs of the AND units 704a-704b are provided to an OR unit 706, which generates a "no scan" output indicating if no measurements or processing devices are available for use.

Figure 8:
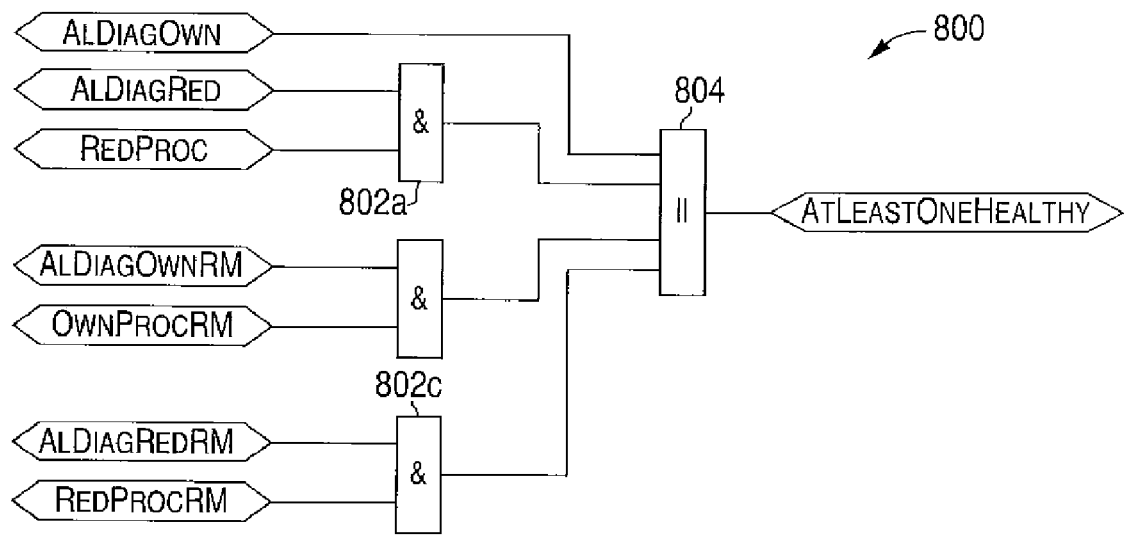

The "at least one healthy" signal shown in FIG. 7 could be determined using the healthy calculation logic 800 shown in FIG. 8. The logic 800 here includes three AND units 802a-802c, which generate outputs identifying whether three of the processing devices are healthy. The outputs of the AND units 802a-802c and an indicator representing the health of the fourth processing device are provided to an OR unit 804, which generates the "at least one healthy" value.

Figure 9:
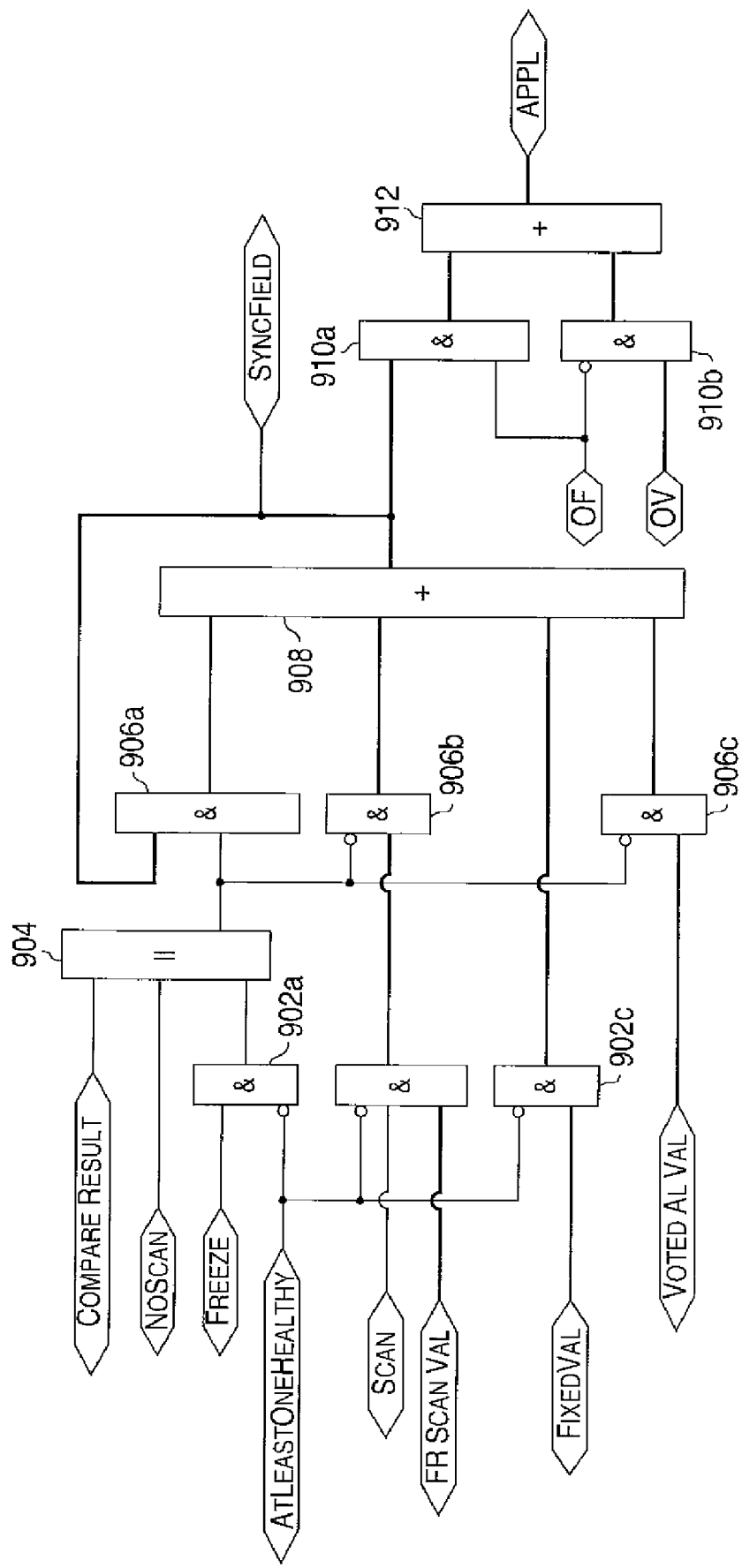

FIG. 9 illustrates final output calculation logic 900, which selects the value that is actually output by the combination logic 110 as the final analog signal measurement. In this example, the logic 900 includes three AND units 902a-902c, which receive various signals related to the FIXED, SCAN, and FREEZE modes of operation. The "Freeze" signal here indicates whether the FREEZE mode of operation is being used. The logic 900 also includes an OR unit 904 and three AND units 906a-906c that receive the output of the OR unit 904.

A summer 908 combines the outputs of the AND units 906a-906c and the output of the AND unit 902c. In this example, the output of the AND unit 906a represents a previous analog signal measurement used when in FREEZE mode, the output of the AND unit 906b represents the FR Scan value used when in SCAN mode, and the output of the AND unit 902c represents the fixed value used when in FIXED mode. The output of the AND unit 906c represents the voted measurement value used when in normal mode (not the FIXED, SCAN, and FREEZE modes). The output of the summer 908 is denoted SyncField and represents a synchronized analog signal measurement.

The SyncField output is provided to two AND units 910a-910b, which are coupled to a summer 912. The AND unit 910b receives an override signal (OV), and the AND units 910a-910b receive an override select signal (OF). Depending on the value of the override select signal, the summer 912 outputs a signal APPL that equals either the synchronized analog signal measurement SyncField or the override signal OV.

In this way, the combination logic 110 can combine analog signal measurements in various ways while also handling situations where no valid signal measurements are generated. This provides a highly flexible arrangement that can generate accurate results even under changing conditions where the number of valid analog signal measurements is varying at any given time. Moreover, this approach can take into account loop statuses and device diagnostics when determining the final analog signal measurements that are output to other components.

Each component of the logic shown in FIGS. 4 through 9 could be implemented using any hardware, software, firmware, or combination thereof. In particular embodiments, the logic shown in FIGS. 4 through 9 could be implemented using software or firmware instructions executed by a microprocessor or other computing device.

Although FIGS. 4 through 9 illustrate example logic for determining field values for an analog input scanned by multiple processing devices, various changes may be made to FIGS. 4 through 9. For example, the logic components shown in FIGS. 4 through 9 are for illustration only. Other logic components could be used to perform the same or similar functions. Also, while the logic in FIGS. 4 through 9 supports the use of various alternate modes of operation (FIXED, SCAN, and FREEZE), one, some, or all of these alternate modes of operation could be omitted. In addition, particular features (such as using the average of all valid measurements) are for illustration only, and other approaches could be used.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, from multiple measuring devices at a combination unit, multiple measurements of an analog signal;
   identifying whether any of the measurements are valid; and
   if at least one of the measurements is valid, generating a final measurement of the analog signal based on the at least one valid measurement;
   wherein identifying whether any of the measurements are valid comprises:
   comparing the measurements to one another;
   determining whether at least two of the measurements are within a specified percentage or amount of one another; and
   performing a majority voting routine to determine whether the measurements that are within the specified percentage or amount of one another constitute a majority of the measurements and, if so, determining that those measurements are valid.

2. The method of claim 1, wherein the final measurement of the analog signal comprises one of:
   an average of the valid measurements; and
   the valid measurement that is closest to the average of the valid measurements.

3. The method of claim 1, wherein the measuring devices comprise processing devices.

4. The method of claim 3, wherein:
   the analog signal comprises a signal from a sensor associated with an industrial process; and
   the method further comprises:
   generating a control signal at one or more of the processing devices based on the signal from the sensor; and
   providing the control signal from at least one of the processing devices to an actuator configured to adjust the industrial process.

5. A method comprising:
   receiving, from multiple measuring devices at a combination unit, multiple measurements of an analog signal;
   identifying at least one of a loop status and diagnostic information associated with each of the measuring devices;
   identifying whether any of the measurements are valid; and
   if at least one of the measurements is valid, generating a final measurement of the analog signal based on the at least one valid measurement;
   wherein identifying whether any of the measurements are valid comprises identifying whether any of the measurements are valid based on at least one of the loop statuses and the diagnostic information associated with the measuring devices.

6. The method of claim 5, further comprising:
   determining at least one of an overall loop status and overall diagnostic information for the measuring devices.

7. The method of claim 5, wherein the measuring devices comprise processing devices.

8. The method of claim 7, wherein:
   the analog signal comprises a signal from a sensor associated with an industrial process; and
   the method further comprises:
   generating a control signal at one or more of the processing devices based on the signal from the sensor; and
   providing the control signal from at least one of the processing devices to an actuator configured to adjust the industrial process.

9. A method comprising:
   receiving, from multiple measuring devices at a combination unit, multiple measurements of an analog signal;
   identifying whether any of the measurements are valid; and
   if at least one of the measurements is valid, generating a final measurement of the analog signal based on the at least one valid measurement;
   wherein the receiving and identifying steps occur during each of multiple iterations of a measurement process; and if none of the measurements is valid during a current iteration, the method further comprises one of:
outputting a specified fixed value as the final measurement of the analog signal;
outputting an average of any available measurements from the measuring devices as the final measurement of the analog signal; and
outputting a prior final measurement of the analog signal obtained during a prior iteration.

10. The method of claim 9, wherein the measuring devices comprise processing devices.

11. The method of claim 10, wherein:
the analog signal comprises a signal from a sensor associated with an industrial process; and
the method further comprises:
generating a control signal at one or more of the processing devices based on the signal from the sensor; and
providing the control signal from at least one of the processing devices to an actuator configured to adjust the industrial process.

12. An apparatus comprising:
multiple measuring devices configured to generate measurements of an analog signal; and
a combination unit configured to:
identify whether any of the measurements are valid; and
if at least one of the measurements is valid, generate a final measurement of the analog signal based on the at least one valid measurement;
wherein the combination unit is configured to identify whether any of the measurements are valid by:
comparing the measurements to one another;
determining whether at least two of the measurements are within a specified percentage or amount of one another; and
performing a majority voting routine to determine whether the measurements that are within the specified percentage or amount of one another constitute a majority of the measurements.

13. The apparatus of claim 12, wherein the combination unit is configured to generate the final measurement of the analog signal by determining one of:
an average of the valid measurements; and
the valid measurement that is closest to the average of the valid measurements.

14. The apparatus of claim 12, wherein the measuring devices comprise processing devices.

15. An apparatus comprising:
multiple measuring devices configured to generate measurements of an analog signal; and
a combination unit configured to:
identify whether any of the measurements are valid; and
if at least one of the measurements is valid, generate a final measurement of the analog signal based on the at least one valid measurement;
wherein the combination unit is further configured to identify at least one of a loop status and diagnostic information associated with each of the measuring devices; and
wherein the combination unit is configured to identify whether any of the measurements are valid based on at least one of the loop statuses and the diagnostic information associated with the measuring devices.

16. The apparatus of claim 15, wherein the combination unit is configured to generate the final measurement of the analog signal by determining one of:
an average of multiple valid measurements; and
the valid measurement that is closest to the average of the valid measurements.

17. The apparatus of claim 15, wherein:
the analog signal comprises a signal from a sensor associated with an industrial process; and
the apparatus is further configured to:
generate a control signal based on the signal from the sensor; and
provide the control signal to an actuator configured to adjust the industrial process.

18. An apparatus comprising:
multiple measuring devices configured to generate measurements of an analog signal; and
a combination unit configured to:
identify whether any of the measurements are valid; and
if at least one of the measurements is valid, generate a final measurement of the analog signal based on the at least one valid measurement;
wherein the combination unit is configured to perform the identifying operation during each of multiple iterations of a measurement process; and
wherein, if none of the measurements is valid during a current iteration, the combination unit is further configured to one of:
select a specified fixed value as the final measurement of the analog signal;
select an average of any available measurements from the measuring devices as the final measurement of the analog signal; and
select a prior final measurement of the analog signal obtained during a prior iteration.

19. The apparatus of claim 18, wherein the combination unit is configured to generate the final measurement of the analog signal by determining one of:
an average of multiple valid measurements; and
the valid measurement that is closest to the average of the valid measurements.

20. The apparatus of claim 18, wherein:
the analog signal comprises a signal from a sensor associated with an industrial process; and
the apparatus is further configured to:
generate a control signal based on the signal from the sensor; and
provide the control signal to an actuator configured to adjust the industrial process.

* * * * *